(12) United States Patent
Taniguchi

(10) Patent No.: US 10,620,639 B2
(45) Date of Patent: Apr. 14, 2020

(54) OPERATION SUPPORT APPARATUS AND OPERATION SUPPORT METHOD

(71) Applicant: TOYOTA JIDOSHA KABUSHIKI KAISHA, Toyota-shi, Aichi-ken (JP)

(72) Inventor: Satoru Taniguchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 15/942,687

(22) Filed: Apr. 2, 2018

(65) Prior Publication Data

US 2018/0307247 A1  Oct. 25, 2018

(30) Foreign Application Priority Data

Apr. 19, 2017 (JP) ................. 2017-082847

(51) Int. Cl.
| G05D 1/02 | (2020.01) |
| G08G 1/00 | (2006.01) |
| G08G 1/01 | (2006.01) |
| G06Q 40/00 | (2012.01) |
| G06Q 50/06 | (2012.01) |

(52) U.S. Cl.
CPC ......... G05D 1/0293 (2013.01); G05D 1/0295 (2013.01); G06Q 40/12 (2013.12); G06Q 50/06 (2013.01); G08G 1/0112 (2013.01); G08G 1/22 (2013.01); *G05D 2201/0213* (2013.01)

(58) Field of Classification Search
CPC .............. G05D 1/0293; G05D 1/0295; G05D 2201/0213; G06Q 50/06; G06Q 40/12; G08G 1/22; G08G 1/0112
See application file for complete search history.

(56) References Cited

U.S. PATENT DOCUMENTS

| 9,355,423 B1 | 5/2016 | Slusar |
| 2019/0080373 A1 | 3/2019 | Takoshima et al. |

FOREIGN PATENT DOCUMENTS

| JP | H10-293899 A | 11/1998 |
| JP | 2004-094780 A | 3/2004 |
| JP | 2010-102660 A | 5/2010 |
| JP | 6016997 B1 | 10/2016 |
| JP | 2017-215681 A | 12/2017 |
| WO | 2015/156731 A1 | 10/2015 |

*Primary Examiner* — Russell Frejd
(74) *Attorney, Agent, or Firm* — Oliff PLC

(57) ABSTRACT

An operation support apparatus comprises an information acquisition unit configured to acquire vehicle information that is information relating to a vehicle capable of participating in convoy travel; a convoy formation unit configured to form a convoy including a plurality of vehicles; a profit calculation unit configured to calculate, based on the vehicle information, a profit generated by performing the convoy travel for each vehicle forming the convoy; and a profit distribution unit configured to generate distribution data that is data for distributing the profits among the plurality of vehicles forming the convoy.

7 Claims, 6 Drawing Sheets

VEHICLE INFORMATION TABLE (INTER-VEHICLE DISTANCE: 5 m)

| VEHICLE ID | VEHICLE TYPE | SOLO TRAVEL | FUEL CONSUMPTION INFORMATION | | | |
|---|---|---|---|---|---|---|
| | | | CONVOY TRAVEL (LEAD) | CONVOY TRAVEL (2ND) | CONVOY TRAVEL (N-TH) | CONVOY TRAVEL (TAIL) |
| 1 | A | 10 | 10.8 | 12.3 | ... | 11.6 |
| 2 | B | 8 | 8.6 | 9.8 | ... | 9.28 |
| 3 | C | 11 | 11.8 | 13.5 | ... | 12.7 |
| 4 | D | 7 | 7.6 | 8.6 | ... | 8.1 |
| ... | | ... | ... | ... | ... | ... |

FIG. 3

OPERATION SUPPORT APPARATUS AND OPERATION SUPPORT METHOD

CROSS REFERENCE TO RELATED APPLICATION

This application claims the benefit of Japanese Patent Application No. 2017-082847, filed on Apr. 19, 2017, which is hereby incorporated by reference herein in its entirety.

BACKGROUND OF THE INVENTION

Field of the Invention

The present invention relates to a technique for supporting convoy travel of vehicles.

Description of the Related Art

In recent years, for the purposes of improving traffic flow and improving fuel consumption by reducing air resistance, techniques that enable a plurality of vehicles to travel in a convoy with a short inter-vehicle distance (also known as platooning, hereinafter, convoy travel) are being developed.

For example, Japanese Patent No. 6016997 discloses a system for controlling convoy travel by having wireless communication apparatuses mounted to a plurality of vehicles perform inter-vehicular communication.

SUMMARY OF THE INVENTION

Since convoy travel by a plurality of vehicles can realize a state where the plurality of vehicles are virtually coupled to one another, drivers of second and subsequent vehicles basically need not perform driving operations. However, unless a vehicle positioned at the head of the convoy is capable of fully automated travel, a driver of the vehicle must perform driving. In addition, an effect of improved fuel consumption obtained due to convoy travel varies significantly depending on a position of a vehicle in the convoy.

In other words, there is a problem in that a sense of fairness is difficult to achieve since a size of benefit differs from one vehicle to another. In addition, due to such reasons, it is difficult to provide services such as combining a plurality of loosely affiliated vehicles (for example, vehicles respectively belonging to different companies, vehicles respectively owned by strangers, or the like) and dynamically forming a convoy.

The present invention has been made in consideration of the problems described above and an object thereof is to enable a plurality of vehicles to perform convoy travel on fair terms.

An operation support apparatus according to the present invention is an apparatus for supporting an operation by convoy travel of a plurality of vehicles.

The present invention in its one aspect provides an operation support apparatus comprising an information acquisition unit configured to acquire vehicle information that is information relating to a vehicle capable of participating in convoy travel; a convoy formation unit configured to form a convoy including a plurality of vehicles; a profit calculation unit configured to calculate, based on the vehicle information, a profit generated by performing the convoy travel for each vehicle forming the convoy; and a profit distribution unit configured to generate distribution data that is data for distributing the profits among the plurality of vehicles forming the convoy.

Vehicle information refers to information relating to a vehicle participating in convoy travel. Vehicle information may be any kind of information as long as the information can be used to form a convoy. For example, vehicle information may be a route traveled by each vehicle, a destination of each vehicle, or information relating to fuel consumption of each vehicle. Alternatively, vehicle information may be data describing cost advantages gained by forming a convoy.

In addition, the convoy formation unit is a unit configured to form a convoy formed by a plurality of vehicles. A section in which convoy travel is performed need not be the same among all vehicles. For example, there may be vehicles that join or break away during convoy travel.

The profit calculation unit is a unit configured to calculate a profit generated due to convoy travel based on vehicle information. For example, a profit may be fuel cost saved due to reduced air resistance or labor cost of a driver who is relieved from driving duty.

The profit distribution unit is a unit configured to generate data (distribution data) for distributing profits generated due to convoy travel to a plurality of vehicles. Distribution data is data for evening up benefits that differ among vehicles in post-processing and may include demand data (for example, data for collecting a part of saved fuel cost) and return data (for example, data for remunerating a driver of a lead vehicle). The profit distribution unit enables a gap between vehicles more likely to benefit from convoy travel and vehicles less likely to benefit from convoy travel to be closed.

As described above, with the operation support apparatus according to the present invention, since a profit generated in convoy travel as a whole can be distributed among individual vehicles, a plurality of vehicles can participate in convoy travel on fair terms.

Also, the convoy travel may be travel in which manual driving is performed for a lead vehicle and automated driving is perform for second and subsequent vehicles, and the profit distribution unit may set a larger distribution ratio of the profit to the lead vehicle as compared to other vehicles.

In a mode in which manual driving is performed only for the lead vehicle of the convoy and second and subsequent vehicles automatically follow the lead vehicle, driving cost (labor cost of a driver) is generated with respect to the lead vehicle but driving cost is reduced in other vehicles. Therefore, a larger portion of the profit may be distributed to the lead vehicle in order to close this gap. Moreover, manual driving need not necessarily be fully manual driving. For example, a mode (semi-automated driving) in which a driver intervenes in response to a request from the system may be adopted.

Also, the vehicle information may include information relating to fuel consumption of the vehicles, and the profit calculation unit may calculate the profit, based on fuel cost saved by each vehicle due to convoy travel.

Information relating to fuel consumption refers to, for example, an actual measured value or a specification value of fuel consumption in each of a case where convoy travel is performed and a case where convoy travel is not performed. Based on this information, fuel cost that can be saved by each vehicle due to convoy travel can be calculated.

Also, the convoy formation unit may determine an order of vehicles in the convoy so as to maximize profits generated by forming the convoy.

By obtaining a combination of vehicles which maximizes the profit obtained due to convoy travel, a most ideal order of vehicles can be determined. Known methods such as a round-robin method, dynamic programming, and bidirectional search may be utilized to determine the order.

Also, the vehicle information may include information relating to routes of the plurality of vehicles, and the convoy formation unit may form the convoy such that a vehicle traveling a longer distance is arranged more forward of the convoy.

According to the configuration described above, since a configuration can be realized in which vehicles break away from the convoy in sequence beginning with those positioned to the rear, reforming of the convoy due to an intermediate vehicle breaking away from the convoy can be kept to a minimum.

Also, the vehicle information may include information relating to fuel consumption of the vehicles, and the convoy formation unit is configured to determine an order of vehicles in the convoy, based on a sum of fuel costs that can be saved due to convoy travel.

For example, a positional order of the vehicles may be determined so that an overall fuel saving effect is maximized.

Also, the convoy formation unit may change, when there is a vehicle positioned at the head of the convoy for more than a prescribed time, a positional order of the vehicles during the travel.

Continuous driving time is an important index in labor management of drivers. When a driver is assigned to a second or subsequent vehicle of the convoy, the driver can rest and travel a longer distance after breaking away from the convoy. Therefore, the positional order of the vehicles may be changed as appropriate so that the continuous driving time of a specific driver does not exceed a prescribed time.

Moreover, the present invention can be specified as an operation support apparatus including at least a part of the units described above. In addition, the present invention can also be specified as an operation support method carried out by the operation support apparatus. The processes and units described above may be implemented in any combination thereof insofar as technical contradictions do not arise.

According to the present invention, a plurality of vehicles can perform convoy travel on fair terms.

BRIEF DESCRIPTION OF THE DRAWINGS

FIG. 3 shows an example of vehicle information according to the first embodiment;

DESCRIPTION OF THE EMBODIMENTS (First Embodiment)
<Outline of System>

Figure 1:
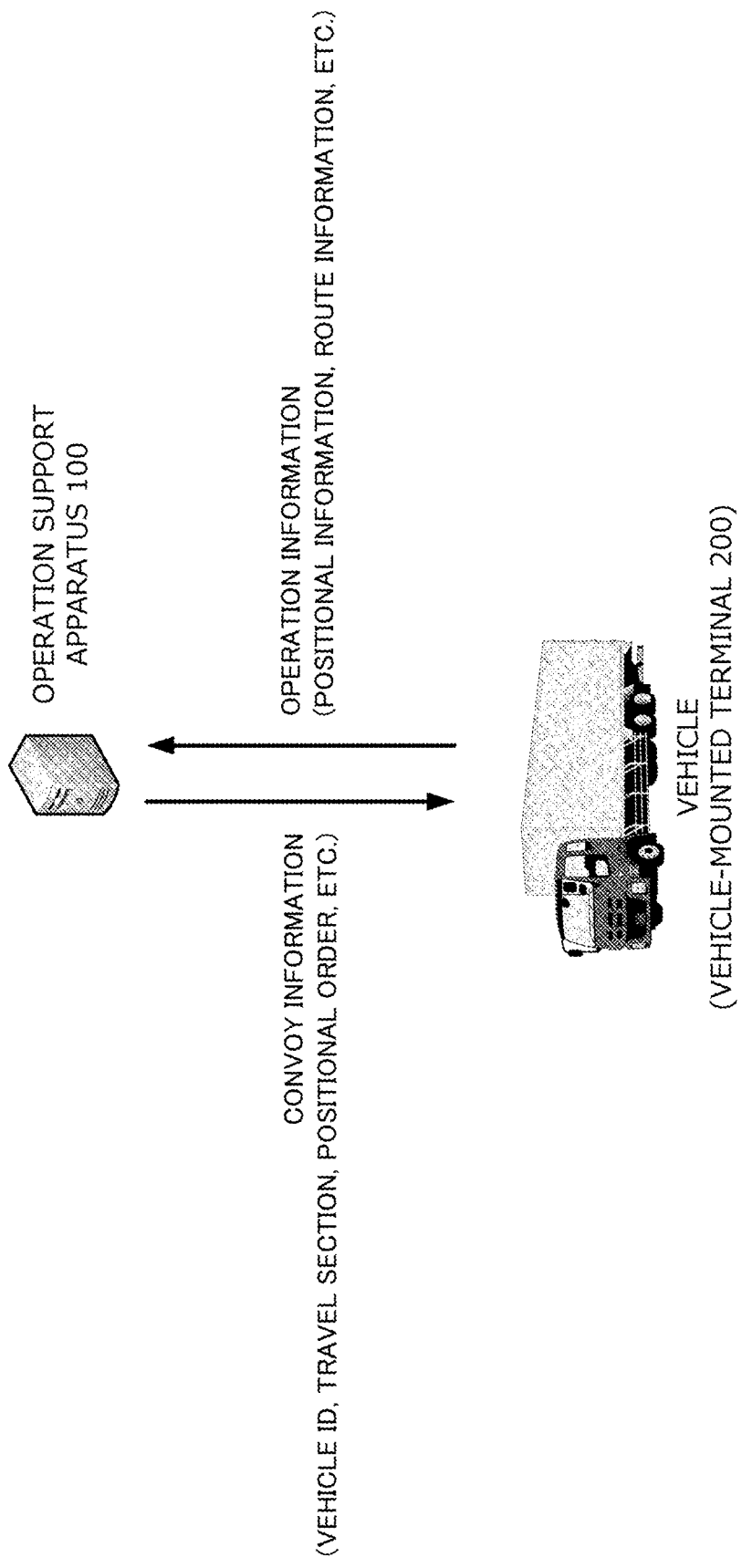
FIG. 1 is a diagram for explaining an outline of a convoy travel system according to the present invention.

An outline of a convoy travel system according to a first embodiment will be described with reference to FIG. 1.

The convoy travel system according to the first embodiment is a system which is constituted by an operation support apparatus 100 and vehicles (vehicle-mounted terminals 200) and in which a plurality of vehicles perform convoy travel in accordance with a plan generated by the operation support apparatus 100.

The vehicle-mounted terminal 200 according to the present embodiment has a function of acquiring positional information, route information (a route planned to be traveled), and the like of a vehicle and periodically transmitting the acquired information to the operation support apparatus 100.

In addition, based on information collected from a plurality of vehicles, the operation support apparatus 100 generates information for performing convoy travel (IDs of vehicles to form a convoy, a travel section, a positional order of vehicles, and the like) and transmits the generated information to each vehicle constituting the convoy. Furthermore, the vehicle-mounted terminal 200 communicates with vehicle-mounted terminals mounted to other vehicles, forms a convoy based on exchanged information, and carries out convoy travel.

On the other hand, in such systems, a problem arises in that vehicles that gain a large profit and vehicles that only gain a small profit (or vehicles with negative profit) are created depending on a positional order of the vehicles.

For example, when convoy travel does not employ full driving automation (driving automation level 4 or more in Japan), a driver of the lead vehicle must perform manual driving or monitor a driving automation system. In contrast, since second and subsequent vehicles simply automatically follow the lead vehicle, drivers of these vehicles can afford to rest.

In addition, in convoy travel, since vehicles positioned in the middle of the convoy gain the highest fuel consumption-enhancing effect but the lead vehicle is subjected to air resistance, a difference is created in resulting fuel consumption.

Prior art is incapable of forming a convoy while taking into consideration profits gained by the respective vehicles of the convoy.

The convoy travel system according to the first embodiment solves this problem by having the operation support apparatus 100 calculate a profit gained by each vehicle due to convoy travel and generate data for redistributing generated profits. Evening up the profits according to the generated data enables all vehicles to perform convoy travel on fair terms.

<System Configuration>

Figure 2:
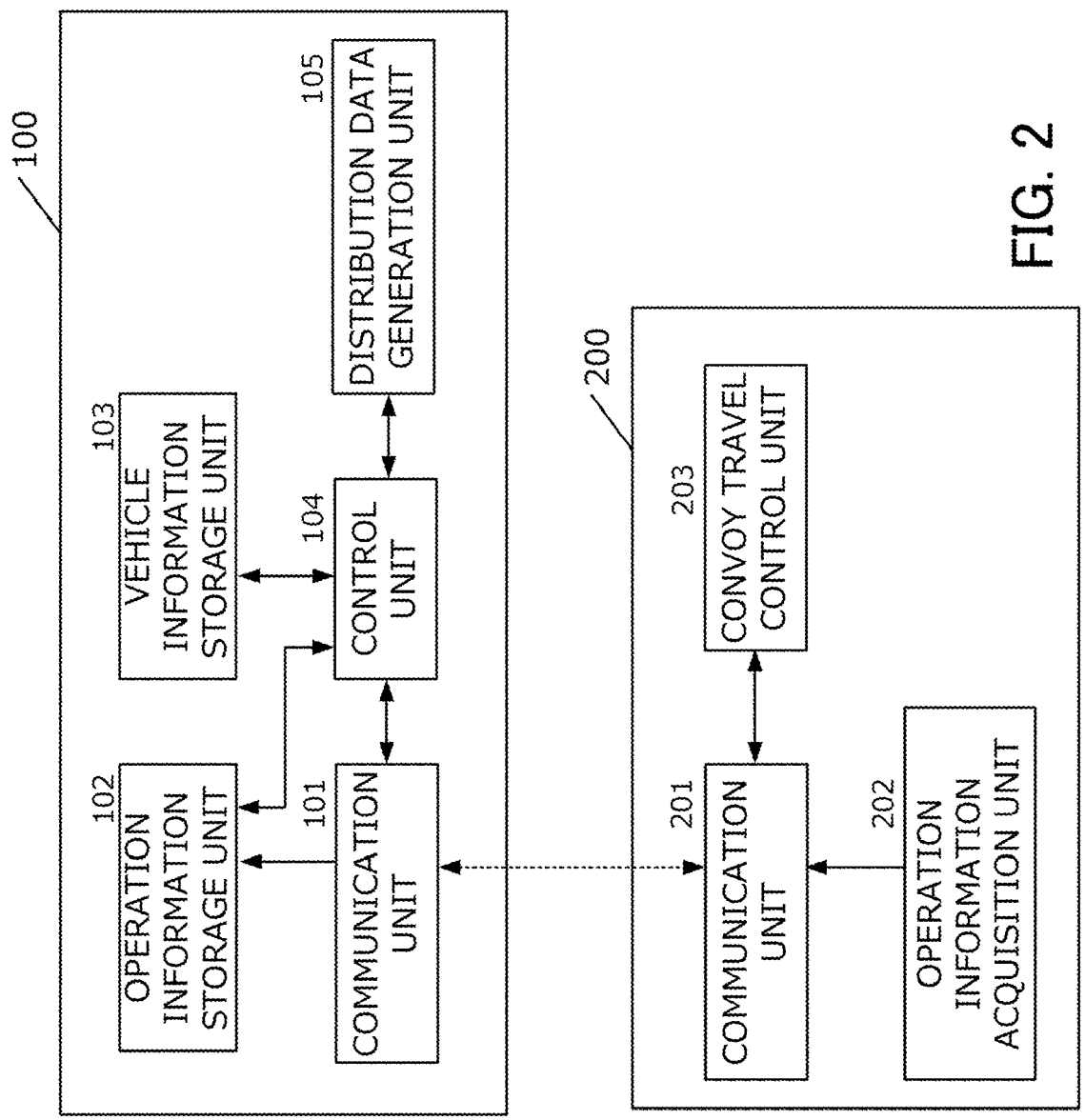
FIG. 2 is a system configuration diagram of a convoy travel system according to a first embodiment.

Hereinafter, a configuration of a convoy travel system for solving the problem described above will be described with reference to FIG. 2 which is a system configuration diagram.

The operation support apparatus 100 is an apparatus which forms a convoy for performing convoy travel based on information collected from a plurality of vehicles managed by the operation support apparatus 100. In addition, after convoy travel is finished, the operation support apparatus 100 calculates a profit gained by each vehicle and generates data for evening up the profits.

The operation support apparatus 100 is configured to include a communication unit 101, an operation information storage unit 102, a vehicle information storage unit 103, a control unit 104, and a distribution data generation unit 105.

The communication unit 101 is a unit that communicates with the vehicle-mounted terminal 200 by accessing a network via a communication line. The communication unit 101 is capable of communicating with the vehicle-mounted terminal 200 positioned at an arbitrary location using existing communication infrastructure such as a cellular communication network.

The operation information storage unit 102 is a unit that collects and stores positional information and route information (hereinafter, operation information) transmitted from the vehicle-mounted terminal 200. In the present embodiment, the vehicle-mounted terminal 200 periodically transmits its own positional information (latitude and longitude) and route information (a route to a destination) to the operation support apparatus 100 and the operation information storage unit 102 stores the received information in association with an identifier of the vehicle-mounted terminal 200 and date/time information.

The vehicle information storage unit 103 is a unit that stores information (hereinafter, vehicle information) relating to a vehicle to which the vehicle-mounted terminal 200 is mounted (in other words, a vehicle capable of participating in convoy travel). Vehicle information according to the present embodiment will be described with reference to FIG. 3. In the present embodiment, vehicle information refers to information relating to fuel consumption of a vehicle. As shown in FIG. 3, a vehicle information table stored in the vehicle information storage unit 103 records an ID and a type of a vehicle, fuel consumption of the vehicle when performing solo travel, as well as fuel consumption of the vehicle at each position in a convoy when performing convoy travel.

Moreover, while an example adopting an inter-vehicle distance of 5 m is demonstrated in the present example, when there are a plurality of conditions of convoy travel, vehicle information may be broken down into each condition. In addition, the recorded fuel consumption may be an actual measured value or a specification value.

The control unit 104 is a unit (a convoy formation unit) which selects vehicles to perform convoy travel and which forms a convoy. Formation of a convoy may be performed based on requests transmitted from the vehicles or may be actively performed by the apparatus.

In addition, the control unit 104 transmits information relating to a generated convoy (information such as IDs, travel sections, and a positional order of vehicles constituting the convoy: hereinafter, convoy information) to the vehicle-mounted terminal 200.

A specific flow of processes will be described later.

The distribution data generation unit 105 is a unit (a profit calculation unit and a profit distribution unit) which calculates, after convoy travel is finished, profits gained by the respective vehicles due to the convoy travel and which generates distribution data for redistributing the profits. Distribution data is data for evening up profits after the fact and may be, for example, data describing money exchanged between vehicles or data describing points or the like.

In the present embodiment, calculation and distribution of profits are performed every time a vehicle joins a convoy or breaks away from the convoy. A specific flow of processes will be described later.

Next, the vehicle-mounted terminal 200 will be described.

The vehicle-mounted terminal 200 is configured so as to include a communication unit 201, an operation information acquisition unit 202, and a convoy travel control unit 203.

The communication unit 201 is a unit that communicates with the operation support apparatus 100 by accessing a network via a communication line. Since functions thereof are similar to those of the communication unit 101, a detailed description will be omitted.

The operation information acquisition unit 202 is a unit that acquires operation information to be transmitted to the operation support apparatus 100. Specifically, the operation information acquisition unit 202 acquires positional information (latitude and longitude) of the vehicle-mounted terminal 200 from a GPS module (not shown) provided on the apparatus, and acquires route information of the vehicle from a navigation apparatus connected to the apparatus.

The positional information and the route information acquired by the operation information acquisition unit 202 are periodically transmitted via a communication line to the operation support apparatus 100 together with an identifier of the vehicle-mounted terminal.

The convoy travel control unit 203 is a unit that executes convoy travel based on the convoy information acquired from the operation support apparatus 100. Specifically, the convoy travel control unit 203 communicates with the vehicle-mounted terminals mounted to other vehicles via a unit (not shown) that performs inter-vehicular communication and, when there are vehicles nearby with mutually matching information included in the convoy information, a convoy is formed by driving automation. In addition, the convoy travel control unit 203 performs sensing utilizing sensors (not shown) to control traveling vehicles.

Flow Chart of Processes

Next, processes performed by the operation support apparatus 100 will be described with reference to FIG. 4.

Figure 4:
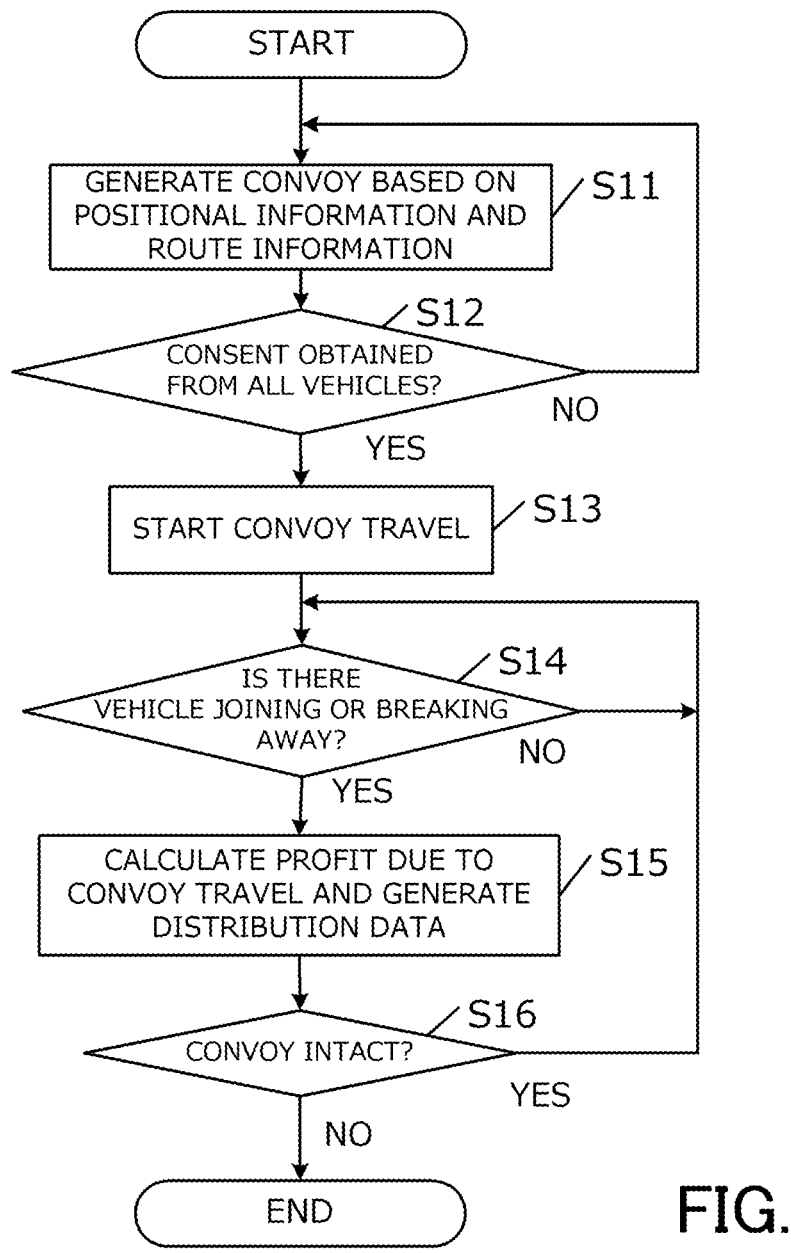
FIG. 4 is a flow chart of processes performed by an operation support apparatus in the first embodiment.

The processes shown in FIG. 4 are started based on a trigger for generating a convoy. The trigger may be generated based on requests transmitted from vehicles or may be actively generated by the apparatus.

First, in step S11, based on positional information (date/time information) and route information collected from each vehicle, the control unit 104 generates a convoy.

The generation of a convoy will now be described in detail with reference to FIG. 5. In the present example, an example in which four vehicles (first to fourth vehicles) form a convoy will be given.

The respective vehicles do not necessarily travel along a same route. In consideration thereof, the control unit 104 determines overlapping routes of the respective vehicles based on route information received from each vehicle, and generates a section and a timing at which convoy travel is to be performed. FIG. 5 shows a route traveled by the first vehicle and an overlapping section of routes traveled by the second to fourth vehicles. In the illustrated example, the second vehicle and the third vehicle join the convoy at point A and the fourth vehicle joins the convoy at point B. In addition, the third vehicle and the fourth vehicle break away from the convoy at point C and the second vehicle breaks away from the convoy at point D.

In this manner, in the first embodiment, the longer a distance traveled on a same route by a vehicle, the more the vehicle is arranged toward the head of the convoy. Accordingly, the effect on the convoy due to vehicles joining and breaking away from the convoy can be minimized.

Once the convoy is generated, the control unit 104 queries the vehicle-mounted terminal that is mounted to each vehicle as to whether or not the vehicle-mounted terminal consents to the plan.

Returning to FIG. 4, the description will be continued.

In step S12, an answer as to whether or not consent is given to convoy travel is acquired from the vehicle-mounted terminal mounted to each vehicle. The answer may be given by the driver of the vehicle or may be automatically given by the vehicle-mounted terminal 200. For example, an indication of consent may be automatically transmitted when the convoy information satisfies prescribed conditions.

In step S12, when there is a vehicle that does not consent, the vehicle is eliminated and the generation of a convoy is retried in step S11.

When consent is obtained from all vehicles, in step S13, the control unit 104 transmits data (convoy information)

necessary for forming a convoy. For example, the control unit 104 respectively transmits convoy information describing each point at which a vehicle is to join or break away from the convoy, an ID of a vehicle joining the convoy at each point, a positional order of vehicles, and the like to the vehicle-mounted terminals 200 mounted to the first to fourth vehicles. Accordingly, convoy travel by the respective vehicles is started.

When a vehicle joins or breaks away from the convoy after convoy travel is started (Yes in step S14), distribution of profits is performed at this timing. Step S15 is executed by the distribution data generation unit 105 with a notification from the vehicle-mounted terminal 200 mounted to the vehicle joining or breaking away from the convoy as a trigger.

The distribution of profits will now be described with reference to FIG. 5.

Figure 5:
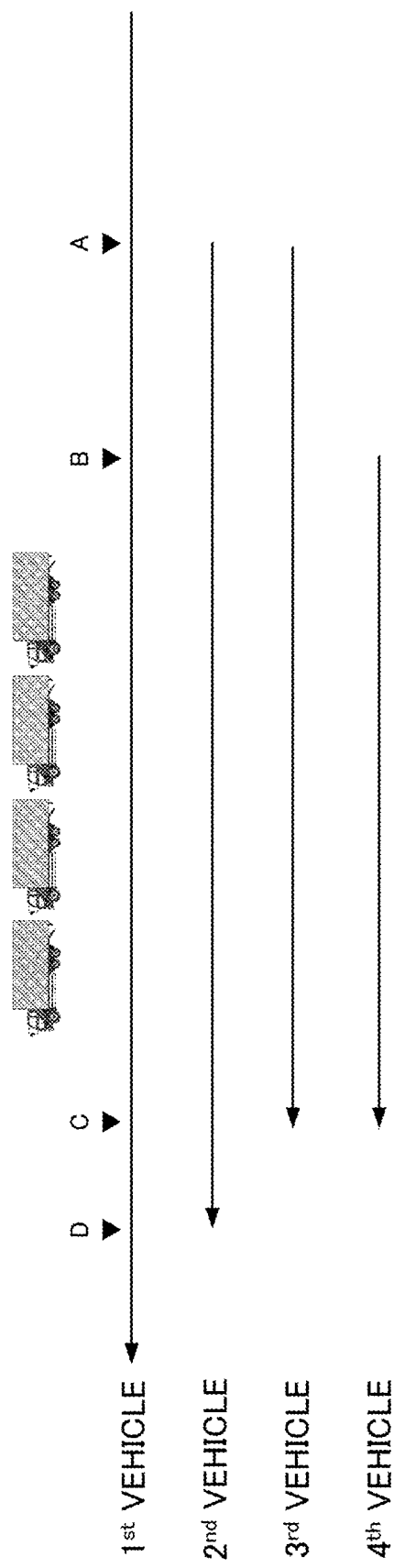
FIG. 5 is a diagram for explaining a formation method of a convoy by a plurality of vehicles.

In the example shown in FIG. 5, a convoy is formed by three vehicles between points A and B, by four vehicles between points B and C, and by two vehicles between points C and D. Therefore, in this example, a section is divided into three parts and distribution data is generated for each part.

Figure 6:
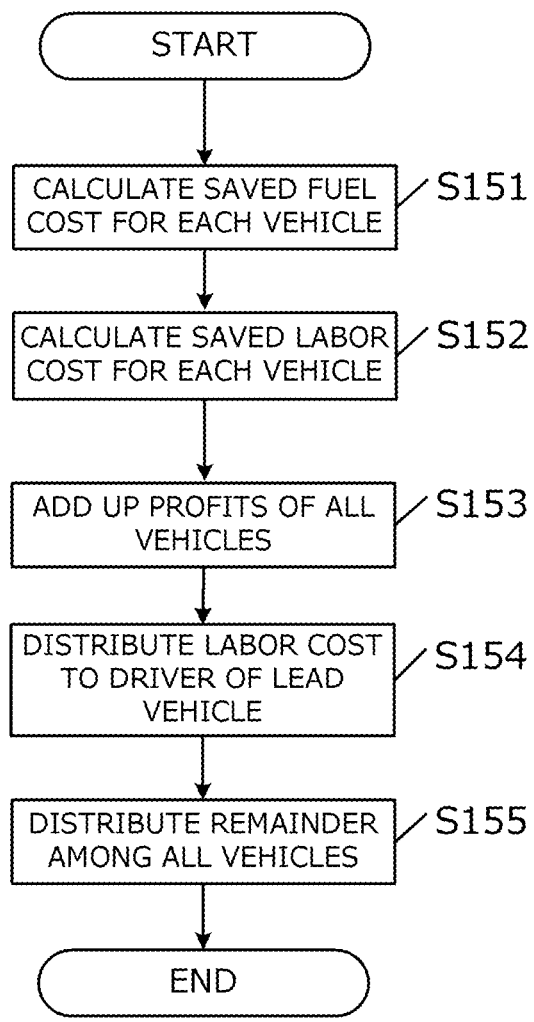
FIG. 6 is a flow chart of a process for distributing a profit.

The distribution of profits is performed as follows. FIG. 6 is a flow chart representing the process performed in step S15 in greater detail.

First, in step S151, fuel cost saved due to convoy travel in a target section is calculated for each vehicle. Fuel cost can be calculated by referring to vehicle information.

Next, in step S152, labor cost saved due to convoy travel in the target section is calculated for each vehicle. Labor cost refers to cost generated when a driver drives. Since drivers can rest in vehicles other than the lead vehicle, cost can be considered saved. Accordingly, advantages such as an extended travel distance after convoy travel is dissolved can be enjoyed.

Next, in step S153, the fuel cost and the labor cost of each vehicle are added up.

Next, in step S154, the labor cost with respect to the driver of the lead vehicle is determined and distribution is made to the lead vehicle from the amount determined in step S153.

Next, in step S155, a remaining amount is distributed among all vehicles.

In the example shown in FIG. 5, profits are distributed among the first to third vehicles upon arrival of the convoy at point B, and profits are distributed among the first to fourth vehicles upon arrival of the convoy at point C. In addition, profits are distributed between the first and second vehicles upon arrival of the convoy at point D.

Returning to FIG. 4, the description will be continued.

In step S16, a determination is made on whether or not the convoy is intact (whether or not there are two or more vehicles). At this point, when there is only one vehicle, the process is ended since convoy travel has been dissolved. When there are two or more vehicles, a return is made to step S14 to continue the process.

As described above, with the convoy travel system according to the first embodiment, a different profit can be redistributed according to a positional order of a vehicle. In particular, since profits are calculated in consideration of fuel consumption, the plurality of vehicles can be placed on an equal footing. In addition, a greater profit can be returned to the driver of the lead vehicle who cannot afford to rest.

Second Embodiment

In the first embodiment, in step S11, control is performed so that the longer a distance traveled on a same route by a vehicle, the more the vehicle is arranged toward the head of the convoy. In contrast, the second embodiment is an embodiment in which a convoy is formed so as to maximize a cost-inhibiting effect due to convoy travel.

In the second embodiment, when generating a convoy in step S11, optimization is performed by further using vehicle information and a combination of vehicles which maximizes an obtained fuel consumption-inhibiting effect is determined. For optimization, for example, known methods such as a round-robin method, dynamic programming, and a bidirectional search may be utilized.

In this manner, in the second embodiment, performing optimization so as to maximize a cost-inhibiting effect enables each vehicle to gain a greater profit.

Moreover, in the second embodiment, a vehicle positioned in the middle of a convoy may break away from the convoy or a new vehicle may join the convoy at the middle of the convoy. When saved cost exceeds the cost of joining or breaking away from the convoy, such measures can be implemented.

Third Embodiment

In the first embodiment, in step S11, the longer a distance traveled on a same route by a vehicle, the more the vehicle is arranged toward the head of the convoy. However, with this method, cases may occur where the driver of the lead vehicle ends up handling driving for a long period of time.

Creating a continuous driving period is not favorable from the perspective of labor management. For example, according to Japanese standards relating to trucks, a 30-minute rest is required whenever a continuous driving period exceeds 4 hours.

In consideration of the problem described above, the third embodiment is an embodiment which suppresses a continuous driving time of a driver of the lead vehicle.

In the third embodiment, when generating a convoy in step S11, the continuous driving time of a driver of the lead vehicle is suppressed using the following two methods.

The first method involves imposing a restriction so that a vehicle arranged at the head does not travel beyond a prescribed time when generating a convoy. For example, a convoy is generated while eliminating patterns which call for a certain vehicle to travel at the head of the convoy for 4 hours or more.

The second method involves reforming the convoy when a vehicle arranged at the head of the convoy travels beyond a prescribed time. For example, when a pattern occurs in which a certain vehicle travels at the head of the convoy for 4 hours or more, vehicles in a convoy are reshuffled in order to ensure rest. In this case, a command for reshuffling the vehicles at a prescribed timing may be included in convoy information and transmitted.

In the third embodiment, since concentration of a burden on the driver of the lead vehicle can be suppressed, a contribution can be made towards improving efficiency of the entire convoy.

Moreover, when interchanging the order of vehicles during travel, cost incurred or a change in profits due to reshuffling of the vehicles may be taken into consideration and, when maximizing the profits, optimization may be performed by considering reshuffling of the vehicles.

Modification

The embodiments described above merely represent examples and the present invention can be implemented with various modifications without departing from the spirit and scope of the invention.

For example, while a value representing fuel consumption is stored as vehicle information in the description of the embodiments, information relating to fuel consumption may be indirectly acquired. For example, fuel consumption or a fuel consumption reduction effect may be estimated by analyzing big data.

Alternatively, a profit may be calculated using indices other than fuel consumption. For example, travel resistance or the like may be utilized.

In addition, while vehicles are arranged from the head in an order of travel distances in the first embodiment, vehicles may be arranged using other indices. For example, vehicles may be arranged from the head in a descending order of reduction effects of travel resistance. Alternatively, a positional order of vehicles may be determined in consideration of requests from the respective vehicles. For example, a request expressing a desire to be positioned at the head in order to receive remuneration, a request expressing a desire for a position other than the head in order to rest, a request expressing a desire for a position that offers a significant fuel consumption reduction effect, and the like can be transmitted and received, and an arrangement of vehicles may be determined in consideration of such requests.

Alternatively, a plan relating to convoy travel may be transmitted to the outside. For example, convoy information may be transmitted to an external apparatus (for example, a toll collection system) to receive a discount on expressway tolls with respect to a section in which convoy travel is performed.

In addition, while confirmation of consent is performed with respect to each vehicle after generating a convoy in the description of the embodiments, vehicles that desire convoy travel may be specified in advance. Furthermore, a profit (a predicted distribution amount) generated due to convoy travel may be presented to the driver of each vehicle.

Moreover, while profits are evenly distributed among all vehicles participating in a convoy in the description of the embodiments, a weight may be imparted to each vehicle. For example, a distributed profit may be adjusted using a vehicle type, a position in the convoy, a vehicle rank, fuel consumption, a pay load, or the like.

In addition, while labor cost is distributed to the lead vehicle in step S154 in the description of the embodiments, this step need not necessarily be executed. For example, in cases where a driver is not burdened such as when the lead vehicle is an automated driving vehicle (a semi-automated driving vehicle), the distribution of labor cost need not be performed. In this manner, the present invention can also be applied to modes in which the lead vehicle is an automated driving vehicle or the like. Furthermore, this step can also be omitted in cases where drivers of the respective vehicles are evenly burdened such as when the lead vehicle is replaced during travel.

In addition, while reshuffling of vehicles during convoy travel has been mentioned in the description of the embodiments, the reshuffling of vehicles need not necessarily be performed during travel. For example, the reshuffling of vehicles may be performed at an intermediate point (a service area, a parking area, or the like). This also applies to the joining or breakaway by a vehicle. Furthermore, drivers may be replaced or transferred in addition to vehicles at an intermediate point.

What is claimed is:

1. An operation support apparatus, comprising:
    a processor programmed to:
        acquire vehicle information that is information relating to a plurality of vehicles capable of participating in convoy travel, the convoy travel being travel in which manual driving is performed for a lead vehicle of the plurality of vehicles and automated driving is performed for second and subsequent vehicles of the plurality of vehicles, the vehicle information including information relating to fuel consumption of the vehicles;
        form a convoy including the plurality of vehicles;
        calculate, based on the vehicle information, a profit generated by performing the convoy travel for each vehicle forming the convoy, the profit being calculated by adding up fuel cost and labor cost saved by each of the plurality of vehicles forming the convoy; and
        generate distribution data that is data for distributing the profits among the plurality of vehicles forming the convoy by:
            determining labor cost with respect to a driver of the lead vehicle;
            distributing to the lead vehicle an amount of the profit based on the labor cost with respect to the driver of the lead vehicle; and
            distributing a remaining amount of the profit to all of the plurality of vehicles forming the convoy.

2. The operation support apparatus according to claim 1, wherein the processor is programmed to:
    determine an order of the vehicles in the convoy so as to maximize profits generated by forming the convoy.

3. The operation support apparatus according to claim 1, wherein:
    the vehicle information includes information relating to routes of the plurality of vehicles; and
    the processor is programmed to form the convoy such that a vehicle traveling a longer distance is arranged more forward within the convoy.

4. The operation support apparatus according to claim 1, wherein:
    the vehicle information includes information relating to fuel consumption of the vehicles; and
    the processor is programmed to determine an order of the vehicles in the convoy based on a sum of fuel costs that can be saved due to convoy travel.

5. The operation support apparatus according to claim 1, wherein the processor is programmed to:
    change, when there is a vehicle positioned at a head of the convoy for more than a prescribed time, a positional order of the vehicles during the travel.

6. An operation support method, comprising:
    acquiring vehicle information that is information relating to a plurality of vehicles capable of participating in convoy travel, the convoy travel being travel in which manual driving is performed for a lead vehicle of the plurality of vehicles and automated driving is performed for second and subsequent vehicles of the plurality of vehicles, the vehicle information including information relating to fuel consumption of the vehicles;
    forming a convoy including the plurality of the vehicles;
    calculating, based on the vehicle information, a profit generated by performing the convoy travel for each vehicle forming the convoy, the profit being calculated by adding up fuel cost and labor cost saved by each of the plurality of vehicles forming the convoy; and
    generating distribution data that is data for distributing the profits among the plurality of vehicles forming the convoy by:
        determining labor cost with respect to a driver of the lead vehicle;

distributing to the lead vehicle an amount of the profit based on the labor cost with respect to the driver of the lead vehicle; and distributing a remaining amount of the profit to all of the plurality of vehicles forming the convoy.

7. A non-transitory computer readable storing medium recording a computer program for causing a computer to perform functions comprising:

acquiring vehicle information that is information relating to a plurality of vehicles capable of participating in convoy travel, the convoy travel being travel in which manual driving is performed for a lead vehicle of the plurality of vehicles and automated driving is performed for second and subsequent vehicles of the plurality of vehicles, the vehicle information including information relating to fuel consumption of the vehicles;

forming a convoy including the plurality of the vehicles;

calculating, based on the vehicle information, a profit generated by performing the convoy travel for each vehicle forming the convoy, the profit being calculated by adding up fuel cost and labor cost saved by each of the plurality of vehicles forming the convoy; and generating distribution data that is data for distributing the profits among the plurality of vehicles forming the convoy by:

determining labor cost with respect to a driver of the lead vehicle;

distributing to the lead vehicle an amount of the profit based on the labor cost with respect to the driver of the lead vehicle; and distributing a remaining amount of the profit to all of the plurality of vehicles forming the convoy.

* * * * *